United States Patent
Daly et al.

(10) Patent No.: US 12,280,815 B2
(45) Date of Patent: Apr. 22, 2025

(54) SYSTEMS FOR POD MOVERS

(71) Applicant: Toyota Motor Engineering & Manufacturing North America, Inc., Plano, TX (US)

(72) Inventors: John F. Daly, Frisco, TX (US); Adrian Lombard, Saline, MI (US); Satoshi Nagashima, New York, NY (US); Trinell Ball, Stamford, CT (US); Brent Bowen, Salt Lake City, UT (US); Vic Hoffman, Salt Lake City, UT (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 340 days.

(21) Appl. No.: 17/878,328

(22) Filed: Aug. 1, 2022

(65) Prior Publication Data

US 2024/0034604 A1 Feb. 1, 2024

(51) Int. Cl.
| | |
|---|---|
| *B62B 5/00* | (2006.01) |
| *B60P 1/64* | (2006.01) |
| *B60P 3/06* | (2006.01) |
| *B62D 63/02* | (2006.01) |
| *B66F 9/06* | (2006.01) |
| *B66F 9/075* | (2006.01) |

(52) U.S. Cl.
CPC .......... *B62B 5/0086* (2013.01); *B60P 1/6445* (2013.01); *B60P 3/06* (2013.01); *B62D 63/025* (2013.01); *B66F 9/063* (2013.01); *B66F 9/075* (2013.01)

(58) Field of Classification Search
CPC ......... B60P 1/6418; B60P 1/6445; B60P 3/06; B62B 5/0086; B66F 3/46; B66F 9/063; B66F 9/0755; B66F 9/07563; B66F 9/122; B66F 9/18; B62D 63/025
USPC ................................ 414/340, 343, 347, 458
See application file for complete search history.

(56) References Cited

U.S. PATENT DOCUMENTS

| | | | |
|---|---|---|---|
| 3,561,621 A * | 2/1971 | Rivers, Jr. ........... | B66F 9/07563 |
| | | | 414/467 |
| 4,936,733 A * | 6/1990 | Girerd .................. | B62B 5/0083 |
| | | | 414/458 |
| 4,968,209 A | 11/1990 | Noble | |

(Continued)

FOREIGN PATENT DOCUMENTS

| | | | | |
|---|---|---|---|---|
| CN | 107310329 A | * | 11/2017 | ............. B60B 19/14 |
| CN | 109205157 A | | 1/2019 | |

(Continued)

*Primary Examiner* — James Keenan
(74) *Attorney, Agent, or Firm* — Dinsmore & Shohl LLP

(57) ABSTRACT

Disclosed herein are apparatus for a system includes a main vehicle and a secondary vehicle configured to couple to the main vehicle. The secondary vehicle includes a wheel configured to move the secondary vehicle and a body coupled to the wheel. The body includes a first set of retractable bars. The first set of retractable bars are configured to extend into receivers of the main vehicle in a deactivated state. The first set of retractable bars are further configured to be disposed in the body in a retracted state. The first set of retractable bars are further configured to extend into a pod and lift the pod in an attached state.

18 Claims, 6 Drawing Sheets

FIG. 1

(56) References Cited

U.S. PATENT DOCUMENTS

| | | | |
|---|---|---|---|
| 5,800,114 A * | 9/1998 | Secondi | B66F 3/46 |
| | | | 410/82 |
| 7,648,329 B2 | 1/2010 | Chilson et al. | |
| 9,352,745 B1 * | 5/2016 | Theobald | B62D 33/00 |
| 10,800,275 B2 * | 10/2020 | Miller | B66F 9/07563 |
| 10,814,982 B2 | 10/2020 | Brown et al. | |
| 10,908,612 B2 * | 2/2021 | Palan | B62D 57/024 |
| 10,994,865 B2 * | 5/2021 | Daw Perez | B66F 9/063 |
| 11,332,352 B2 * | 5/2022 | Bowers | B66F 7/28 |
| 11,485,575 B2 * | 11/2022 | Dooley | B66F 7/0625 |
| 11,511,981 B2 * | 11/2022 | Marshall | B66F 9/122 |
| 11,524,846 B2 * | 12/2022 | Cesic | B66F 9/063 |
| 11,724,897 B2 * | 8/2023 | Galin | B60P 3/06 |
| | | | 414/812 |
| 2009/0035106 A1 * | 2/2009 | Mammone | B65F 3/02 |
| | | | 414/389 |
| 2019/0259000 A1 * | 8/2019 | Buckhalt | G07C 9/00817 |
| 2021/0114854 A1 * | 4/2021 | Roethling | B66F 9/127 |
| 2022/0017341 A1 * | 1/2022 | Henderson | B66F 9/063 |
| 2022/0379792 A1 * | 12/2022 | Wehner | B66F 9/063 |

FOREIGN PATENT DOCUMENTS

| | | | | |
|---|---|---|---|---|
| CN | 109703632 A | | 5/2019 | |
| EP | 1218282 B1 * | | 12/2004 | B66F 9/07563 |
| EP | 1995206 A1 * | | 11/2008 | B66F 9/063 |
| EP | 3536584 A1 * | | 9/2019 | B62D 24/00 |
| JP | 2008006882 A * | | 1/2008 | |
| JP | 2022074959 A * | | 5/2022 | |
| RU | 2698267 C1 | | 8/2019 | |
| WO | WO-2022084522 A1 * | | 4/2022 | B66F 7/0666 |

\* cited by examiner

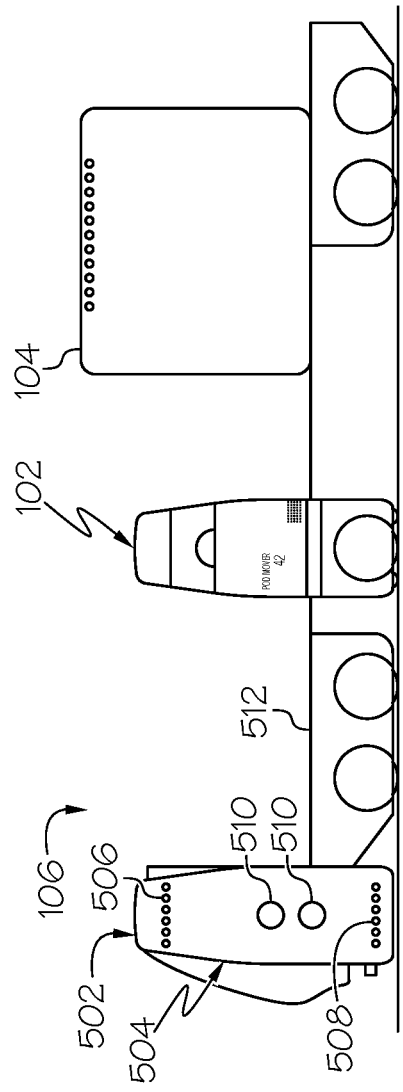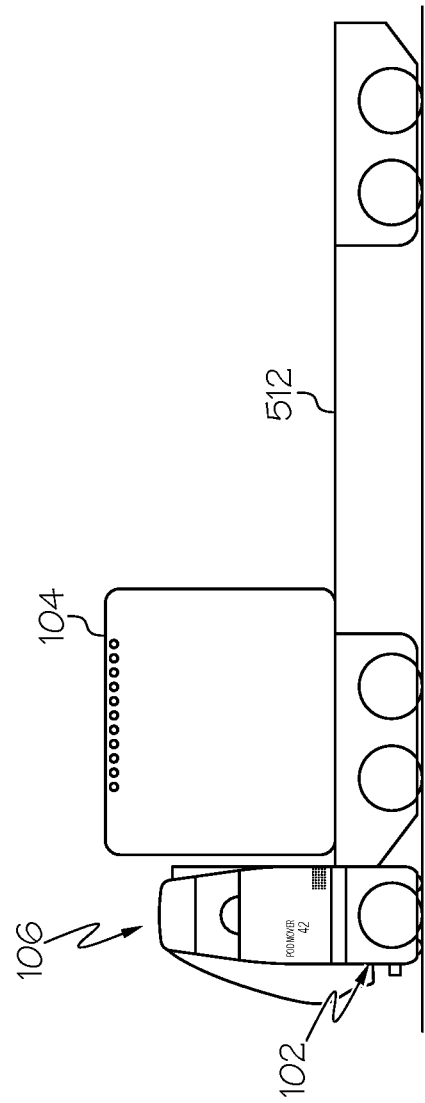

SYSTEMS FOR POD MOVERS

TECHNICAL FIELD

The present specification generally relates to apparatus for pod movers, and, more specifically, apparatus for using pod movers for moving modular pods with increased flexibility and mobility.

BACKGROUND

As modular spaces continue to be utilized, storage areas for modular pods may not be effectively utilized. This may be a result of pod movers having poor maneuverability, dropping cargo, and have to be regularly refueled. This results in wasted space, increased down-time, and increased build time.

Accordingly, a need exists for a pod mover that has improved maneuverability, reduces the amount of dropped cargo, and does not need to be regularly refueled.

SUMMARY

In one embodiment, apparatus for a system includes a main vehicle and a secondary vehicle configured to couple to the main vehicle. The secondary vehicle includes a wheel configured to move the secondary vehicle and a body coupled to the wheel. The body includes a first set of retractable bars. The first set of retractable bars are configured to extend into receivers of the main vehicle in a deactivated state. The first set of retractable bars are further configured to be disposed in the body in a retracted state. The first set of retractable bars are further configured to extend into a pod and lift the pod in an attached state.

In another embodiment, apparatus for a pod mover includes a set of retractable bars and a controller. The controller is programmed to detect a coupling between the retractable bars and a pod. The controller is further programmed to instruct the pod mover to place the pod onto a bed of a truck in response to detecting the coupling. The controller is further programmed to detect a decoupling between the retractable bars and the pod. The controller is further programmed to instruct the pod mover to couple to a docking station disposed on the truck in response to detecting the decoupling.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5C schematically depicts the system of FIG. 5A at a different state of the system; and FIG. 5D schematically depicts the system of FIG. 5A at a different state of the system.

DETAILED DESCRIPTION

Figure 1:
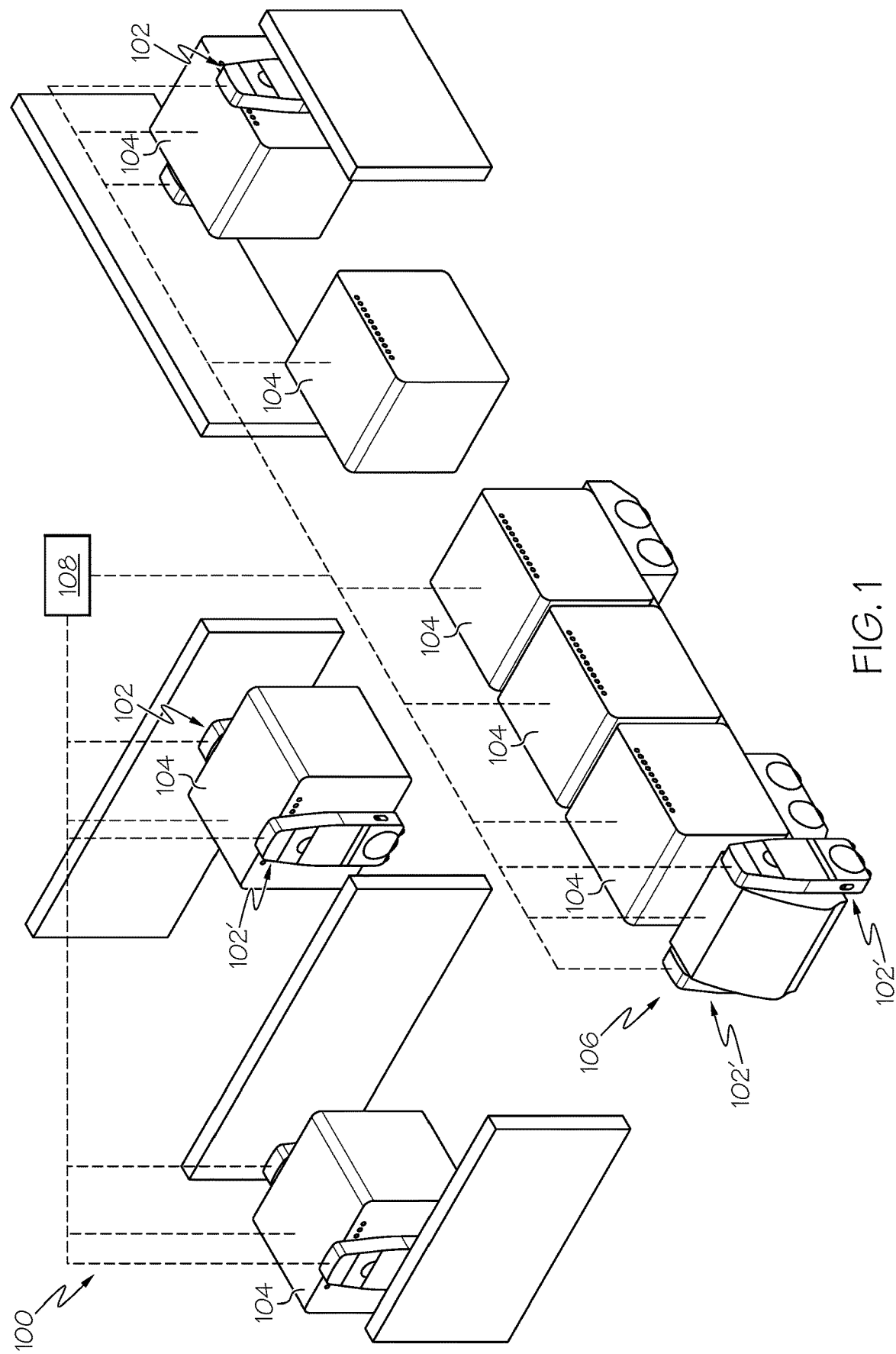
FIG. 1 schematically depicts an environment view of a system having a primary vehicle and a plurality of secondary vehicles, according to one or more embodiments shown and described herein.

Embodiments described herein are directed to a system that includes a primary vehicle and a pair of secondary vehicles which co-operatively facilitate for efficient use of modular pod space. The pair of secondary vehicles may co-operatively move (e.g., translate) modular pods within the modular pod space. The pair of secondary vehicles may then place (e.g., load) the modular pods on to the primary vehicle. In embodiments, the pair of secondary vehicles may be coupled to and translate with the primary vehicle. Further, the pair of secondary vehicles may be configured to have improved maneuverability using spherical wheels within the modular pod space. The pair of secondary vehicles may also include sets of retractable bars in order to translate the modular pods. The sets of retractable bars may also be used to couple to the primary vehicle. Various embodiments of the apparatus and the operation of the apparatus are described in more detail herein. Whenever possible, the same reference numerals will be used throughout the drawings to refer to the same or like parts.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply ab solute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, an environmental view of a system 100 for moving a plurality of modular pods 104 is illustrated, according to one or more embodiments described herein. In embodiments, the environment of the system 100 may be a modular pod area which contains a plurality of modular pods 104 for storage (e.g., such as a warehouse, storage area). In these embodiments, the system 100 may operate completely autonomously without intervention of a user. In embodiments, the environment of the system 100 may be an office environment where users may be located within the modular pods 104 and/or around the modular pods 104 (e.g., an office environment, a social environment). In embodiments, the environment of the system 100 is an outdoor environment (e.g., a park, an outdoor venue).

The system 100 may generally include a primary vehicle 106, a plurality of secondary vehicles 102, and a controller, such as a server 108. The server 108 may be a remote server or a local server including, but not limited to, a roadside unit, an edge server, and the like. While FIG. 1 depicts a single server, the present system may include a plurality of servers that are distributed over a larger area managed by the servers. As discussed in greater detail herein, the primary vehicle 106 and the plurality of secondary vehicles 102 may be all communicatively coupled to the server 108, thereby facilitating for the server 108 to transmit and provide signals to the primary vehicle 106 and to each of the plurality of secondary vehicles 102. Further, the primary vehicle 106 and the plurality of secondary vehicles 102 may communicate directly or via the server 108. In embodiments, information processing may be off-loaded by the primary vehicle 106 and the plurality of secondary vehicles 102, and instead be processed by the server 108.

The plurality of secondary vehicles 102 may be autonomous and connected, thereby allowing for its navigation within its environment with limited human input or without human input. A pair of secondary vehicles 102 may cooperate to translate a modular pod 104 within the environment. The pair of secondary vehicles 102 may translate the modular pod 104 from a first position to a second position within the modular pod area. Further, the pair of secondary vehicles 102 may move the modular pod 104 from a storage area and load it on the primary vehicle 106 or vice versa. As discussed in greater detail in FIG. 2, the primary vehicle 106 and the plurality of secondary vehicles 102 may be communicatively coupled via the server 108, thereby allowing for the primary vehicle 106 and the plurality of secondary vehicles 102 to cooperate. Each of the plurality of secondary vehicles 102 may communicate with the server 108 and transmits its data to the server 108. For example, each of the plurality of secondary vehicles 102 may transmit information about its current location, destination, information regarding the modular pod, information about a task that it is currently implementing, its environment and the like.

As further illustrated in FIG. 1, a prime indicator may be used to distinguish a first secondary vehicle 102 from a tertiary vehicle, which may be a second secondary vehicle 102'. Both the first secondary vehicle 102 and the second secondary vehicle 102' are examples of pod movers. The first secondary vehicle 102 and the second secondary vehicle 102' may be substantially similar in structure and/or operation. In embodiments, the first secondary vehicle 102 and the second secondary vehicle 102' may define varying attributes in relation to their structure/or operation. In a first example the first secondary vehicle 102 and the second secondary vehicle 102' may be structured similarly (e.g., constructed of the same components), but in operation the first secondary vehicle 102 may be temporarily configured to control operation of the second secondary vehicle 102'. In a second example, the first secondary vehicle 102 may include an antenna for communicating with the server 108 while the second secondary vehicle 102' may not include an antenna. In this example, the first secondary vehicle 102 may be coupled to the second secondary vehicle 102' via a short range signal (e.g., Bluetooth®, infrared, rear-field communication, ultraband, Zigbee). These examples should in no way be limiting and are disclosed to illustrate various configurations that may be utilized between a pair of secondary vehicles 102.

As discussed in greater detail herein, each of the plurality of secondary vehicles 102 may include one or more spherical wheels. In this way, the plurality of secondary vehicles 102 may define 360 degree mobility within the modular pod area. As will also be discussed in greater detail herein, each of the plurality of secondary vehicles 102 may include a plurality of presence sensors so that each of the plurality of secondary vehicles 102 may travel within the modular pod area.

The primary vehicle 106 may be autonomous and connected, thereby allowing for its navigation within its environment with limited human input or without human input. Although a single primary vehicle 106 is depicted, a plurality of primary vehicles 106 may be located within and/or adjacent to the modular pod area. The primary vehicle 106 cooperates with the plurality of secondary vehicles 102 to load and/or unload modular pods 140 onto or off the primary vehicle 106. The primary vehicle 106 may communicate with the server 108 and transmit its data to the server 108. For example, the primary vehicle 106 may transmit information about its current location, destination, information about the modular pods 104, information about a task that it is currently implementing, its environment and the like.

In embodiments, the modular pods 104 may also be communicatively coupled to the server 108. In these embodiments, the modular pods 104 may include position sensors and/or storage information. The modular pods 104 may then provide the position of each modular pod 104 and what is contained within the modular pods 104 to the server 108.

Figure 2:
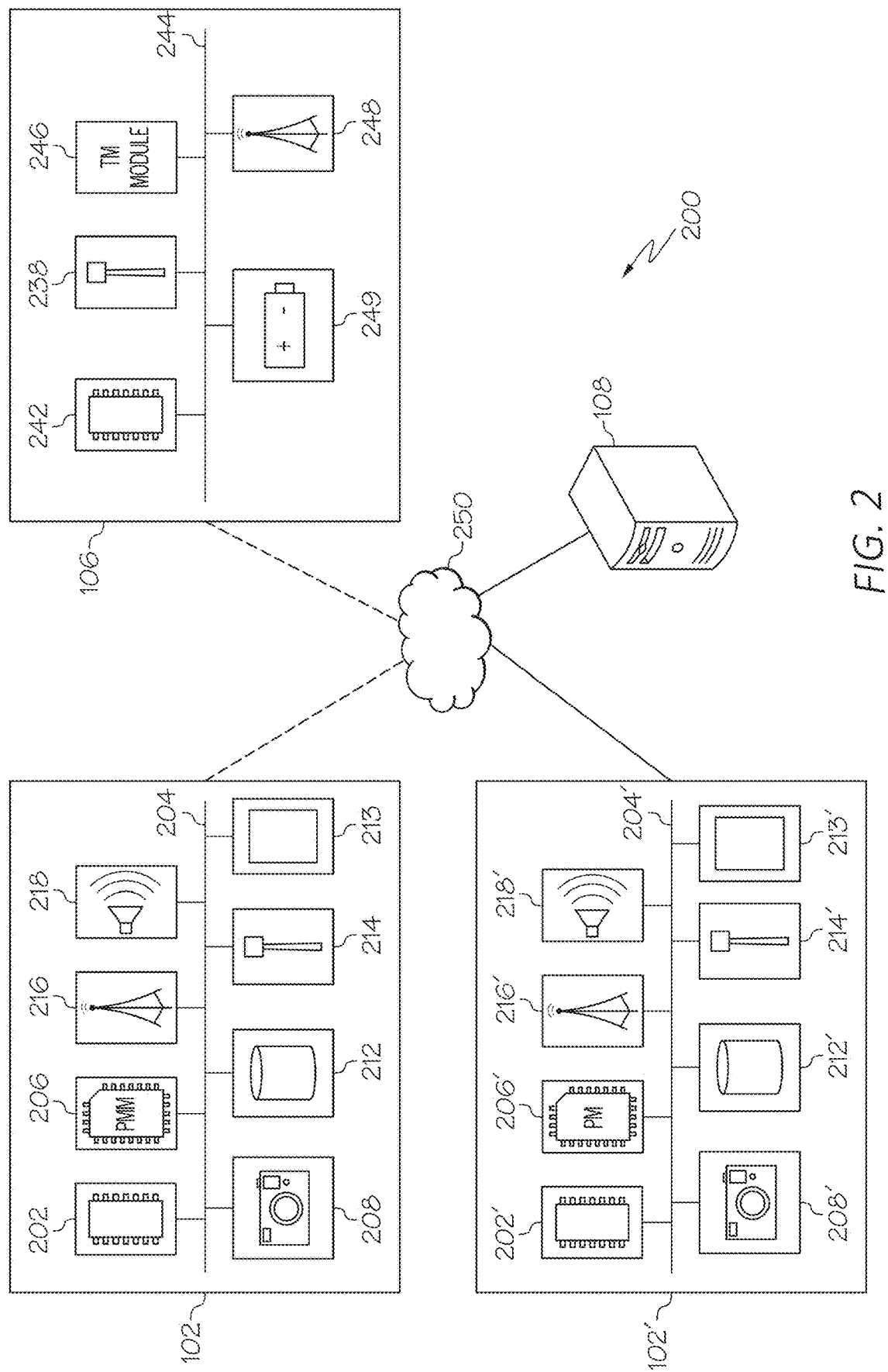
FIG. 2 schematically depicts a system for controlling a pair of secondary vehicles, according to one or more embodiments shown and described herein.

FIG. 2 schematically depicts a system 200 for moving a plurality of pods in a modular pod area is shown, according to one or more embodiments shown and described herein. The system may include the first secondary vehicle 102, the second secondary vehicle 102', the primary vehicle 106, and the server 108. It is noted that, while the system 200 is depicted in isolation, the system 200 may be included in a modular pod area such as in FIG. 1. In embodiments, the system 200 may be included in any of first secondary vehicle 102, the second secondary vehicle 102', and/or the primary vehicle 106 during travel of the primary vehicle 106.

The first secondary vehicle 102 may include one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The first secondary vehicle 102 may include one or more memory modules 206 coupled to the communication path 204. The one or more memory modules 206 may include RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one of the one or memory modules 206 may include a pod mover module. The pod mover module may be a program module in the form of operating systems, application program modules, and other program modules stored in one or more memory modules 206. In some embodiments, the program module may be stored in a remote storage device that may communicate with the server 108. Such a program module may include, but is not limited to, routines, subroutines, programs, objects, components, data structures and the like for performing specific tasks or executing specific data types as will be described below.

The pod mover module, when executed by the one or more processors 202, may identify a location of the first secondary vehicle 102, the second secondary vehicle 102', a modular pod, and the primary vehicle 106. The pod mover module may then evaluate and/or receive instructions from the server 108 as to where the modular pods should be placed. The pod mover module may then instruct the secondary vehicle 102 to move to a predetermined distance away from the pod. The pod mover module may then instruct the secondary vehicle 102 to then pick up the modular pod. The pod mover module may then evaluate and determine a trajectory of the first secondary vehicle 102 and the second secondary vehicle 102' in order to move a modular pod at a first location to a second location.

For example, the pod mover module may receive instructions from the server 108 to move a particular modular pod currently located on the primary vehicle 106 to a designated spot within the modular pod area. The pod mover module may evaluate the location of the first secondary vehicle 102 and the second secondary vehicle 102' and determine a trajectory to the particular modular pod located on the primary vehicle 106. The pod mover module may then provide instructions to the first secondary vehicle 102 and the second secondary vehicle 102' to travel along the determined trajectory. The pod mover module may then determine and provide instructions to execute a loading plan to couple the first secondary vehicle 102 and the second secondary vehicle 102' to the particular modular pod. The pod mover module may then determine and provide instructions to execute a trajectory from the present location of the first secondary vehicle 102 and the second secondary vehicle 102' to the designated spot within the modular pod area. Once the first secondary vehicle 102 and the second secondary vehicle 102' are positioned at the designated spot within the modular pod area, the pod mover module may then determine and provide instructions to execute an unloading plan to unload the particular modular pod at the designated spot within the modular pod area. During this process, the modular pod module may receive data from the one or more sensors 208 in order to prevent collisions during the process. Further, the modular pod module may provide alerts to the surrounds of the first secondary vehicle 102 and the second secondary vehicle 102' through the screen 213 and the speaker 218. During the process, the pod mover module may provide updates (e.g., task status, possible collisions, battery level, user inputs) and/or receive updates (e.g., pause, update trajectory, and the like) from the server 108, via the network 250.

Referring still to FIG. 2, the first secondary vehicle 102 includes one or more sensors 208. The one or more sensors 208 may be any device having an array of sensing devices capable of detecting radiation in an ultraviolet wavelength band, a visible light wavelength band, or an infrared wavelength band. The one or more sensors 208 may be imaging sensors having any resolution. In some embodiments, one or more optical components, such as a mirror, fish-eye lens, or any other type of lens may be optically coupled to the one or more sensors 208. In embodiments described herein, the one or more sensors 208 may provide navigation support. That is, data captured by the one or more sensors 208 may be used to autonomously or semi-autonomously navigate the first secondary vehicle 102.

The one or more sensors 208 may include a plurality of presence sensors that collect data of the surroundings of the first secondary vehicle 102. The one or more sensors 208 may include sensors that collect a distance away from a modular pod, the distance away from the second secondary vehicle 102', and/or the distance away from the primary vehicle 106. Further, the one or more sensors 208 may include a near field communication chip that communicates with the second secondary vehicle 102', the primary vehicle 106, and/or the modular pod. In embodiments, the plurality of presence sensors includes visual sensors and proximity sensors.

The first secondary vehicle 102 includes one or more pod mover sensors 212. Each of the one or more pod mover sensors 212 is coupled to the communication path 204 and communicatively coupled to the one or more processors 202. The one or more pod mover sensors 212 may include one or more motion sensors for detecting and measuring motion and changes in motion of the pod mover. The motion sensors may include inertial measurement units. Each of the one or more motion sensors may include one or more accelerometers and one or more gyroscopes. Each of the one or more motion sensors transforms sensed physical movement of the pod mover into a signal indicative of an orientation, a rotation, a velocity, or an acceleration of the pod mover.

The first secondary vehicle 102 may include a screen 213 for providing visual output such as, for example, warnings, signal indicators and the like. In embodiments, the screen 213 may be used to display advertisements. The screen 213 may be positioned on an exterior of the first secondary vehicle 102 such that users outside of the first secondary vehicle 102 may see the screen 213. The screen 213 is coupled to the communication path 204. Accordingly, the communication path 204 communicatively couples the screen 213 to other modules of the first secondary vehicle 102 including, without limitation, the one or more processors 202 and/or the one or more memory modules 206. The screen 213 may include any medium capable of transmitting an optical output such as, for example, a cathode ray tube, a light emitting diode (LED) display, an organic light emitting diode (OLED) display, a liquid crystal display, a plasma display, or the like. In embodiments, the screen 213 may be a touchscreen that, in addition to visually displaying information, detects the presence and location of a tactile input upon a surface of or adjacent to the screen 213. Accordingly, each display may receive mechanical (e.g., touch) input directly upon the optical output provided by the screen. Additionally, it is noted that the screen 213 can include at least one of the one or more processors 202 and at least one of the one or memory modules 206. The screen 213 may illustrate a status indicator of the first secondary vehicle 102. For example, the screen 213 may illustrate the current tasks of the first secondary vehicle 102, warnings, battery level, and the like. Further, the screen 213 may be used to provide inputs to the first secondary vehicle 102, such as re-prioritizing tasks, powering down the first secondary vehicle 102, and the like.

The first secondary vehicle 102 may include a satellite antenna 214 coupled to the communication path 204 such that the communication path 204 communicatively couples the satellite antenna 214 to other modules of the first secondary vehicle 102. The satellite antenna 214 is configured to receive signals from the server 108 and/or global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

Still referring to FIG. 2, the first secondary vehicle 102 may include network interface hardware 216 for communicatively coupling the first secondary vehicle 102 to the server 108. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the first secondary vehicle 102 may transmit its data to the server 108. For example, the network interface hardware 216 of the first secondary vehicle 102 may transmit vehicle data, location data, and the like to other pod movers, the primary vehicle 106 or the server 108.

The first secondary vehicle 102 may connect with one or more other secondary vehicles 102, 102' and/or external processing devices (e.g., the server 108) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect (e.g., the network 250), which may be in lieu of, or in addition to, a direct connection (such as V2V or V2X) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the first secondary vehicle 102 may be communicatively coupled to the server 108 by a network 250. In one embodiment, the network 250 may include one or more computer networks (e.g., a personal area network, a local area network, or a wide area network), cellular networks, satellite networks and/or a global positioning system and combinations thereof. Accordingly, the first secondary vehicle 102 can be communicatively coupled to the network 250 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, Zig-Bee, and/or other near field communication protocols. Suitable cellular networks include, but are not limited to, technologies such as LTE, WiMAX, UMTS, CDMA, and GSM.

The first secondary vehicle 102 may further include the speaker 218. The speaker 218 may provide audio messages to a surrounding of the first secondary vehicle 102. In embodiments, the speaker 218 may be used to alert users near the first secondary vehicle 102. These user alerts may include low battery, detected collision, current tasks, and the like. In embodiments, the speaker 218 includes a microphone for the user to utilize.

In embodiments, the second secondary vehicle 102' may be similarly structured to the first secondary vehicle 102. As discussed in greater detail above, the second secondary vehicle 102' may include more components or less components when compared to the first secondary vehicle 102.

Still referring to FIG. 2, the primary vehicle 106 may include one or more processors 242. Each of the one or more processors 242 may be any device capable of executing machine readable and executable instructions. Accordingly, each of the one or more processors 242 may be a controller, an integrated circuit, a microchip, a computer, or any other computing device. The one or more processors 242 are coupled to a communication path 244 that provides signal interconnectivity between various modules of the system. Accordingly, the communication path 244 may communicatively couple any number of processors 242 with one another, and allow the modules coupled to the communication path 244 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 244 may be formed from any medium that is capable of transmitting a signal such as, for example, conductive wires, conductive traces, optical waveguides, or the like. In some embodiments, the communication path 244 may facilitate the transmission of wireless signals, such as WiFi, Bluetooth®, Near Field Communication (NFC) and the like. Moreover, the communication path 244 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The primary vehicle 106 may further include network interface hardware 248 for communicatively coupling the primary vehicle 106 to the server 108. The network interface hardware 248 can be communicatively coupled to the communication path 244 and can be any device capable of transmitting and/or receiving data via a network. Accordingly, the network interface hardware 248 can include a communication transceiver for sending and/or receiving any wired or wireless communication. For example, the network interface hardware 248 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 248 includes hardware configured to operate in accordance with the Bluetooth® wireless communication protocol. The network interface hardware 248 of the primary vehicle 106 may transmit its data to the server 108. For example, the network interface hardware 248 of the primary vehicle 106 may transmit vehicle data, location data, and the like to other pod movers, the primary vehicle 106 or the server 108.

The primary vehicle 106 may connect with one or more secondary vehicles 102, 102' and/or external processing devices (e.g., the server 108) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect (e.g., the network 250), which may be in lieu of, or in addition to, a direct connection (such as V2V or V2X) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

The primary vehicle 106 may include one or more power charging stations 249 on an external surface of the primary vehicle 106. The one or more power charging stations 249 may electrically couple to the secondary vehicles 102, 102' when the secondary vehicles 102, 102' are coupled to the exterior surface of the primary vehicle 106. The one or more power charging stations 249 may provide charge to the secondary vehicles 102, 102'. In embodiments, the secondary vehicles 102, 102' may provide electric charge to the primary vehicle 106.

The primary vehicle 106 may include a satellite antenna 238 coupled to the communication path 244 such that the communication path 244 communicatively couples the satellite antenna 238 to other modules of the primary vehicle 106. The satellite antenna 244 is configured to receive signals from the server 108 and/or global positioning system satellites. Specifically, in one embodiment, the satellite antenna 244 includes one or more conductive elements that interact with electromagnetic signals transmitted by global positioning system satellites. The received signal is transformed into a data signal indicative of the location (e.g., latitude and longitude) of the satellite antenna 244 or an object positioned near the satellite antenna 244, by the one or more processors 242.

The primary vehicle 106 may include one or more memory modules 246 coupled to the communication path 244. The one or more memory modules 246 may include RAM, ROM, flash memories, hard drives, or any device capable of storing machine readable and executable instructions such that the machine readable and executable instructions can be accessed by the one or more processors 242. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 246. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one of the one or memory modules 246 may include a truck module. The truck module may be a program module in the form of operating systems, application program modules, and other program modules stored in one or more memory modules 246. In some embodiments, the program module may be stored in a remote storage device that may communicate with the server 108. Such a program module may include, but is not limited to, routines, subroutines, programs, objects, components, data structures and the like for performing specific tasks or executing specific data types as will be described below.

The truck module, when executed by the one or more processors 242, may identify a location of the first secondary vehicle 102, the second secondary vehicle 102', a modular pod, and the primary vehicle 106. The truck module may then receive instructions from the server 108 as to where the modular pods should be transported to. The truck module may then determine whether the modular pod is loaded onto the primary vehicle 106 or receive signals as to when the modular pod is expected to be loaded onto the primary vehicle 106. The truck module may then determine or receive instructions of a trajectory from the current location of the primary vehicle 106 to a desired location.

For example, the pod mover module may receive instructions from the server 108 to transport a particular modular pod to a second storage area. The truck module may then instruct the primary vehicle 106 to wait at a first storage area until the particular modular pod has been loaded. Further, the truck module may instruct the secondary vehicle 102, 102' where to load the particular modular pod to most effectively unload the modular pods along an unloading path of the primary vehicle 106. In this example, the modular pods that are scheduled to be transported first may be loaded on the rear and outside locations of the primary vehicle 106, while modular pods that are scheduled to be transported later are loaded at the front and interior locations of the primary vehicle 106.

Once the particular modular pod has been loaded onto the primary vehicle 106, the primary vehicle 106 may travel to the second storage area based on the determined trajectory. In embodiments, the secondary vehicle 102, 102' may be coupled to and travel with the primary vehicle 106 from the first storage area to the second storage area. Once the primary vehicle 106 has reached the second storage area, the particular modular pod may then be unloaded from the primary vehicle 106 using the secondary vehicle 102, 102' coupled to the primary vehicle 106 or secondary vehicle 102, 102' designated to the second storage area.

Figure 3A:
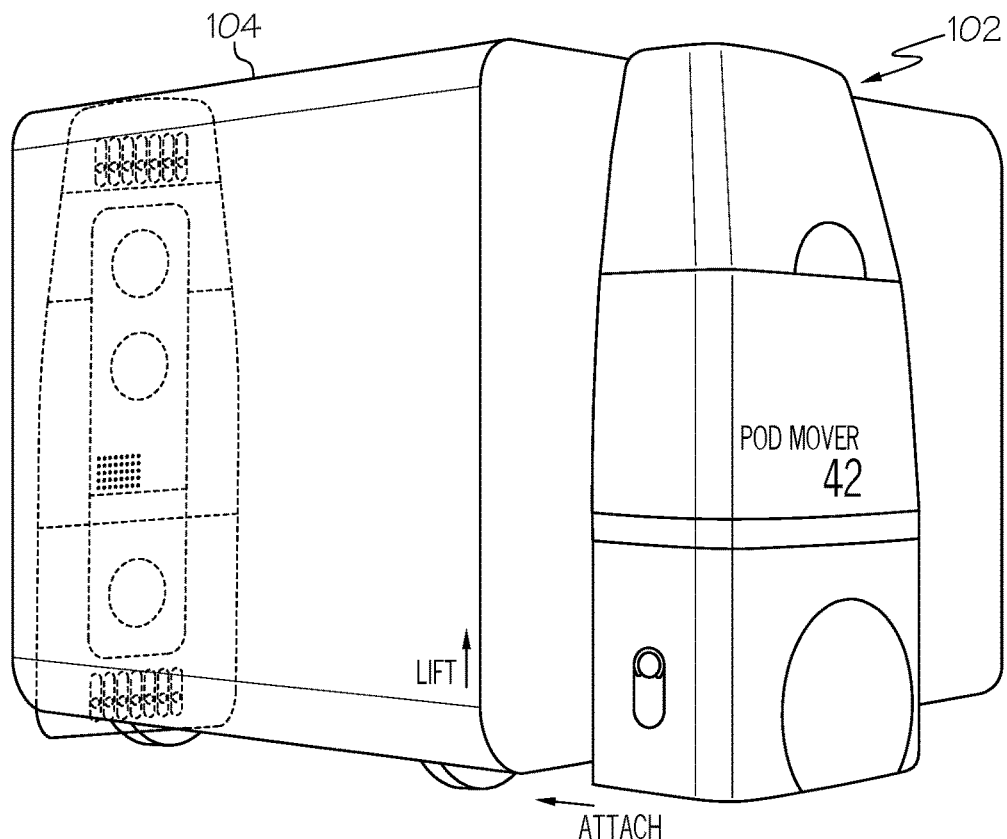
FIG. 3A schematically depicts a perspective view of a system having a pair of secondary vehicles, according to one or more embodiments shown and described herein.
Figure 3B:
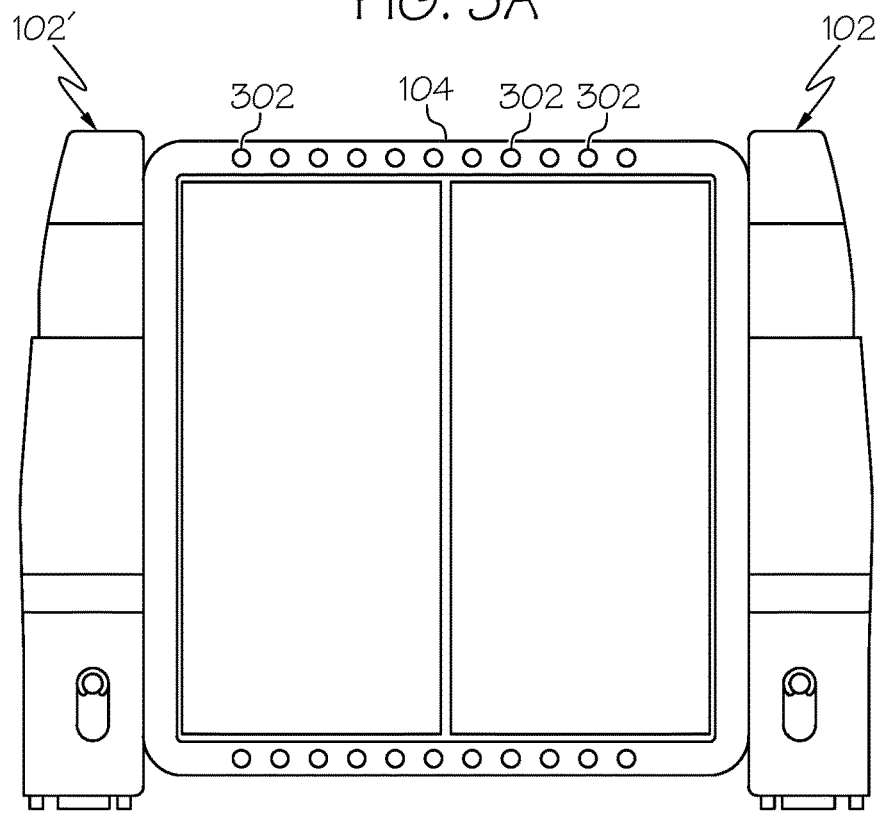
FIG. 3B schematically depicts a front view of the system of FIG. 3A.

Referring now to FIGS. 3A-3B, a pair of secondary vehicles 102, 102' are illustrated with a modular pod 104, according to various embodiments. The pair of secondary vehicles 102, 102' cooperate to move and/or load or unload a modular pod 104 within a modular pod area. In embodiments, the loading of the modular pod 104 may be an attached state of the pair of secondary vehicles 102, 102'. Further, when the pair of secondary vehicles 102, 102' are not carrying a modular pod 104, it may be referred as a detached state. Before moving the modular pod 104, the pair of secondary vehicles 102, 102' may first move to opposing sides of the modular pod 104. As will be discussed in reference to FIGS. 4A-4B, using a plurality of presence sensors, the pair of secondary vehicles 102, 102' may each then move towards a respective side of the modular pod 104.

The modular pod 104 may contain a plurality of receiving apertures 302. The plurality of receiving apertures may be located along a perimeter of the modular pod 104. As depicted, the plurality of receiving apertures 302 are located at a top edge and a bottom edge of a side of the modular pod 104. However, the plurality of receiving apertures 302 may also be located on the side edges of the modular pod 104 or in a center portion of the modular pod 104.

Figure 4C:
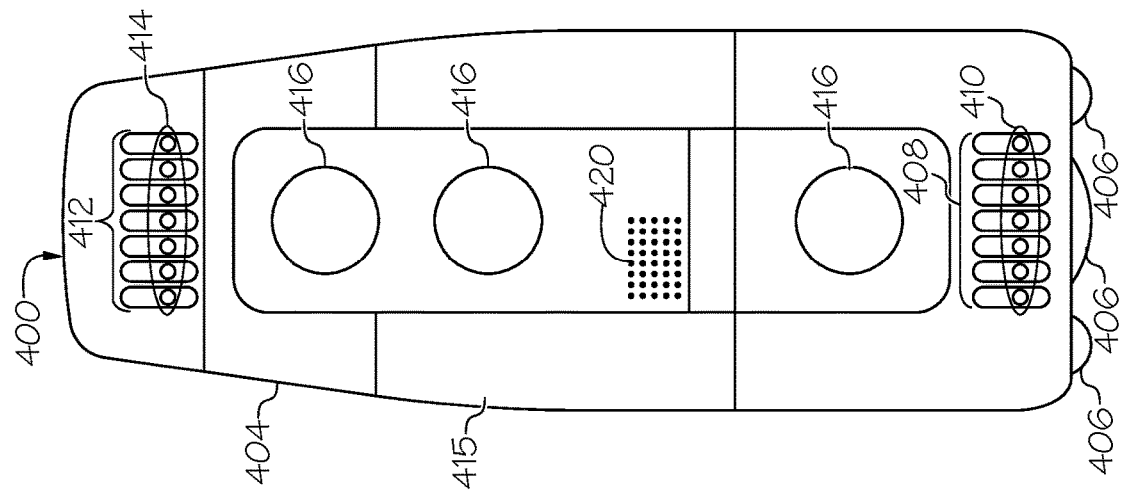
FIG. 4C schematically depicts a rear view of the pod mover of FIG. 4A.
Figure 4B:
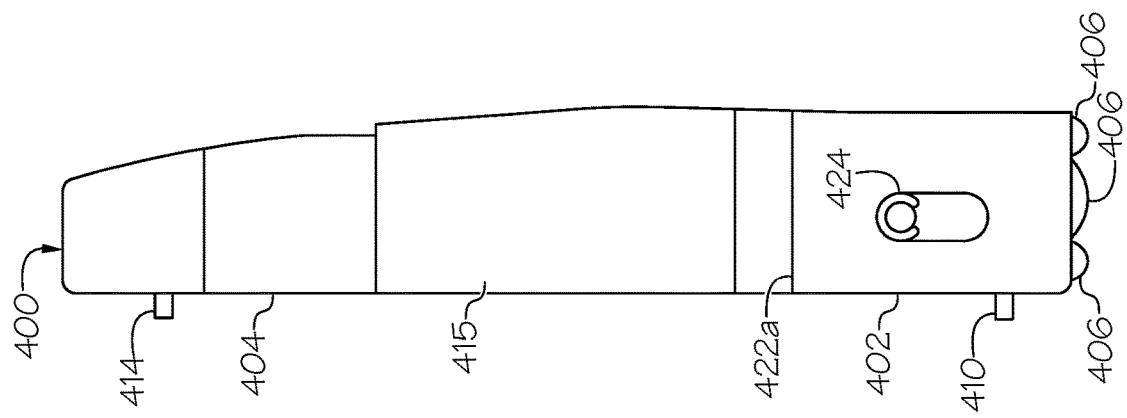
FIG. 4B schematically depicts a side view of the pod mover of FIG. 4A.
Figure 4A:
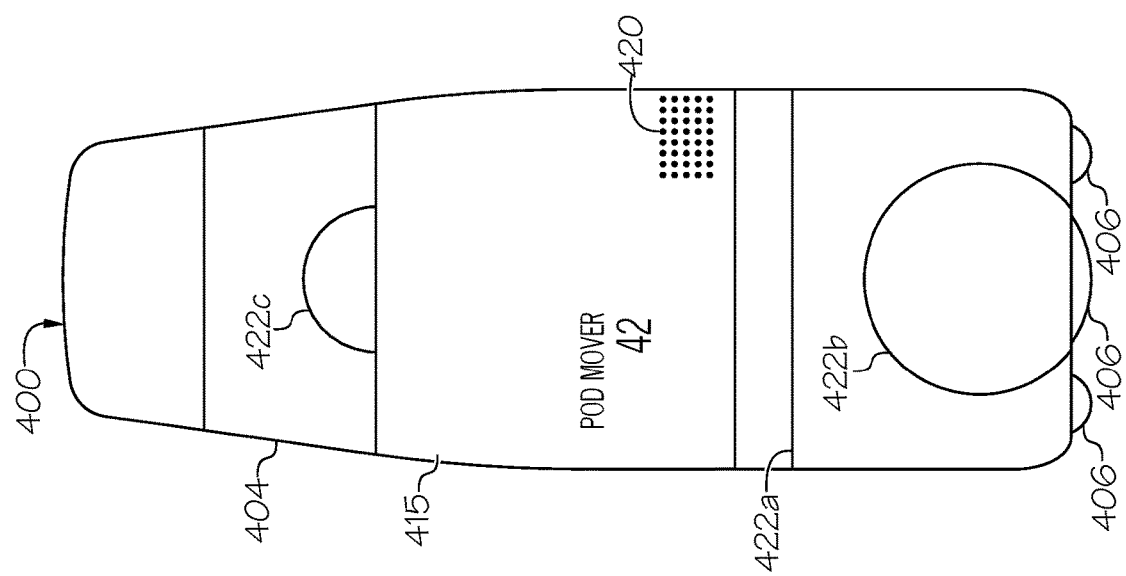
FIG. 4A schematically depicts a front view of a pod mover, according to one or more embodiments shown and described herein.

As will also be discussed in reference to FIGS. 4A-4B, the pair of secondary vehicles 102, 102' each contain sets of retractable bars configured to extend from each of the pair of secondary vehicles 102, 102' and into the plurality of receiving apertures 302. The sets of retractable bars may be shaped and sized to enter into the plurality of receiving apertures 302. This allows for the pair of secondary vehicles 102, 102' to cooperatively attach onto the modular pod 104. Using the sets of retractable bars, the pair of secondary vehicles 102, 102' may then lift (e.g., translate in a vertical direction) the modular pod 104. This allows for the pair of secondary vehicles 102, 102' to move the modular pod 104 from a first location to a second location.

Referring now to FIGS. 4A-4C, a pod mover 400 is shown, according to some embodiments. The pod mover 400 may be similar in structure to the secondary vehicles 102 discussed in greater detail above. The pod mover 400 may include a housing 404 (e.g., shell). The housing 404 extends along a length of the pod mover 400 and may house the internal components of the secondary vehicle 102. The housing 404 may be partitioned and assembled together or may be formed as a single monolithic component. The pod mover 400 may be electrically driven. In this way, the pod mover 400 may have less downtime for refueling as compared to conventional fuel-driven cargo movers.

A base portion of the housing 404 may be configured to be heavier relative to a top portion of the housing 404. This may be accomplished by placing components, such as a gyroscope, at the base of the housing 404. Further, the housing 404 may have weighted components placed at the base. This is advantageous as it mitigates an opportunity for the pod mover 400 to tip over.

The pod mover 400 may further include a set of wheels 406. The set of wheels 406 facilitate movement of the pod mover 400 within the modular pod area. The set of wheels 406 receive power from a motor (not shown) positioned in the housing 404. As depicted, the set of wheels 406 are spherical wheels, however, any suitable wheel may be used. In embodiments using spherical wheels, the one or more wheels 406 facilitate for the pod mover 400 to move with 360° mobility. As discussed in greater detail herein, the set of wheels 406 may be configured to translate vertically and retract into the housing 404. In this way, the pod mover 400 may be coupled to a primary vehicle and not damage the set of wheels 406 during travel of the primary vehicle 106.

The pod mover 400 may further include a first set of apertures 408 and a first set of retractable bars 410 positioned within the first set of apertures 408. The first set of apertures 408 and the first set of retractable bars 410 may be positioned at a bottom portion of the housing 404. In this way, the first set of retractable bars 410 may engage a bottom portion of a modular pod. The first set of apertures 408 may define an oval shape so that the first set of retractable bars 410 may translate vertically. In embodiments, the first set of retractable bars 410 may be at least partially disposed within the housing 404 when the pod mover 400 is not carrying a modular pod in a retracted state. In embodiments, the first set of retractable bars 410 are fully positioned within the housing 404 when the pod mover 400 is not carrying a modular pod in the retracted state. The first set of retractable bars 410 may be at least partially constructed of iron, but any suitable material may be utilized, such as steel, aluminum, hardened plastics, tungsten, and the like.

When in the attached position, the first set of retractable bars 410 are configured to extend away horizontally from the first set of apertures 408 and into a plurality of receiving apertures of a modular pod. The first set of retractable bars 410 are further configured to translate vertically upwards and downwards within the first set of apertures 408. In this way, the first set of retractable bars 410 may load or unload a modular pod.

The pod mover 400 may further include a second set of apertures 412 and a second set of retractable bars 414 positioned within the second set of apertures 412. The second set of apertures 412 and the second set of retractable bars 414 may be positioned at a top portion of the housing 404. In this way, the second set of retractable bars 414 may engage a top portion of a modular pod.

The second set of apertures 412 may define an oval shape so that the second set of retractable bars 414 may translate vertically. In embodiments, the second set of retractable bars 414 may be at least partially disposed within the housing 404 when the pod mover 400 is not carrying a modular pod in the retracted state. In embodiments, the second set of retractable bars 414 are fully positioned within the housing 404 when the pod mover 400 is not carrying a modular pod in the retracted state. The second set of retractable bars 414 may be at least partially constructed of iron, but any suitable material may be utilized, such as steel, aluminum, hardened plastics, tungsten, and the like.

When engaging with and carrying a modular pod, the second set of retractable bars 414 are configured to extend away horizontally from the second set of apertures 412 and into a plurality of receiving apertures of a modular pod. The second set of retractable bars 414 are further configured to translate vertically upwards and downwards within the second set of apertures 412. In this way, the second set of retractable bars 414 may load or unload a modular pod.

The first set of retractable bars 410 and the second set of retractable bars 414 cooperate to engage and load or unload a modular pod. In this way, the modular pod may be engaged from several points and mitigate an opportunity to tip the modular pod. In embodiments, only the first set of retractable bars 410 are utilized. In these embodiments, the first set of retractable bars 410 may be positioned at a bottom portion, a middle portion, or a top portion of the housing 404.

In embodiments, the first set of retractable bars 410 and the second set of retractable bars 414 may include a locking mechanism. The locking mechanism may be positioned on both the first set of retractable bars 410 and the second set of retractable bars 414 or either of the first set of retractable bars 410 and the second set of retractable bars 414. Further, the locking mechanism may be only used on select bars of the set of retractable bars. The locking mechanism may engage a locking feature within the modular pod, thereby further securing the pod mover 400 to the modular pod.

In embodiments, the pod mover 400 may include a screen 415 for providing visual output such as, for example, signal indicators, task status, and the like. The screen 415 may be positioned on the housing 404 of the pod mover 400 such that users outside of the pod mover 400 may see the screen 415. Further, the screen 415 may be used to receive inputs from the user. The screen 415 may be similarly configured to the screen 213 discussed in greater detail above.

In embodiments, the pod mover 400 may include a plurality of presence sensors 416. The plurality of presence sensors 416 may collect data of the surroundings of the pod mover 400. The plurality of presence sensors 416 may include sensors that collect a distance away from a modular pod, the distance away from the other pod movers 400, and/or the distance away from the primary vehicle 106. Further, the plurality of presence sensors 416 may provide 360° vision of the surroundings of the pod mover 400, thereby removing any blind spots in the surroundings of the pod mover 400. The plurality of presence sensors 416 may also be used to generate a three-dimensional environment surrounding the pod mover 400. The plurality of presence sensors 416 may generate the three-dimensional environment based on the signals received from the plurality of presence sensors 416. In embodiments, the plurality of presence sensors 416 provide signals indicative of the surroundings of the pod mover 400 to a server. The server may then generate the three-dimensional environment surrounding the pod mover 400. The plurality of presence sensors 416 may be similarly structured to the one or more sensors 208 discussed in greater detail above.

The pod mover 400 may further include one or more pod mover sensors 424. Although depicted on a single side of the pod mover 400, the one or more pod mover sensors 424 may be placed on any side of the pod mover 400. The one or more pod mover sensors 424 may include one or more motion sensors for detecting and measuring motion and changes in motion of the pod mover 400.

Each of the one or more pod mover sensors 424 may include one or more accelerometers and one or more gyroscopic assemblies. Further, each of the one or more pod mover sensors 424 may include inertial measurement units. Each of the one or more pod mover sensors 424 transforms sensed physical movement of the pod mover 400 into a signal indicative of an orientation, a rotation, a velocity, or an acceleration of the pod mover 400. In response to receiving signals from the one or more pod mover sensors 424, the pod mover 400 may be configured to adjust its movement in order to mitigate any opportunities to tip-over.

For example, if during a turn, a threshold is exceeded, based on signals received from the one or more pod mover sensors 424, the pod mover 400 may then decrease its velocity in similar turns in the future. The one or more pod mover sensors 424 may be similarly structured to the one or more pod mover sensors 212 disclosed in greater detail above.

The pod mover 400 may further include one or more speakers 420. The one or more speakers 420 may provide audio messages to a surrounding of the pod mover 400. In embodiments, the one or more speakers 420 may be used to alert users near the pod mover 400. These user alerts may include low battery, detected collision, current tasks, and the like. In embodiments, the one or more speakers 420 includes a microphone for the user to utilize. The one or more speakers 420 may each be similarly structured to the speaker 218 discussed in greater detail above.

The pod mover 400 may further include one or more visual indicators 422a, 422b, and 422c. The one or more visual indicators 422a, 422b, and 422c may any of LED strips, screens, or any suitable visual indicator. Further, the one or more visual indicators 422a, 422b, and 422c may define various geometries and shapes. As depicted in FIG. 4, 422a defines a straight line, which extends along the exterior surface of the pod mover 400. Also as depicted in FIGS. 4, 422b and 422c curved lines on the exterior of the pod mover 400. The one or more visual indicators 422a, 422b, and 422c provide users a visual indicator of the status of the pod mover 400. For example, if the one or more visual indicators 422a, 422b, and 422c display the color red, it may indicate that the pod mover 400 has stopped operation. In another example, if the one or more visual indicators 422a, 422b, and 422c display the color orange, it may indicate that the pod mover 400 requires service. In this way, a user may view a plurality of pod movers 400 to quickly assess a status of each pod mover 400. Further, each of the one or more visual indicators 422a, 422b, and 422c may be used to indicate a status of varying components of the pod mover 400. For example, 422b may be used to display a status of the one or more wheels 406. Further, 422a may be used to display a task status of the pod mover 400. Further, 422c may be used to indicate a connection status (e.g., connection to another pod mover 400, connection to a main vehicle).

Figure 5A:
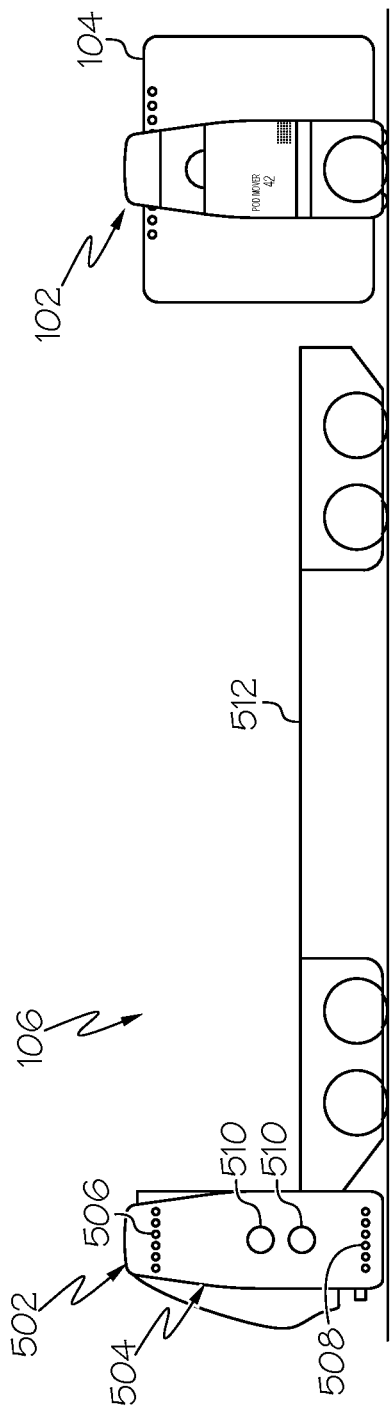
FIG. 5A schematically depicts a system having a primary vehicle and a pair of secondary vehicles, according to one or more embodiments shown and described herein.
Figure 5B:
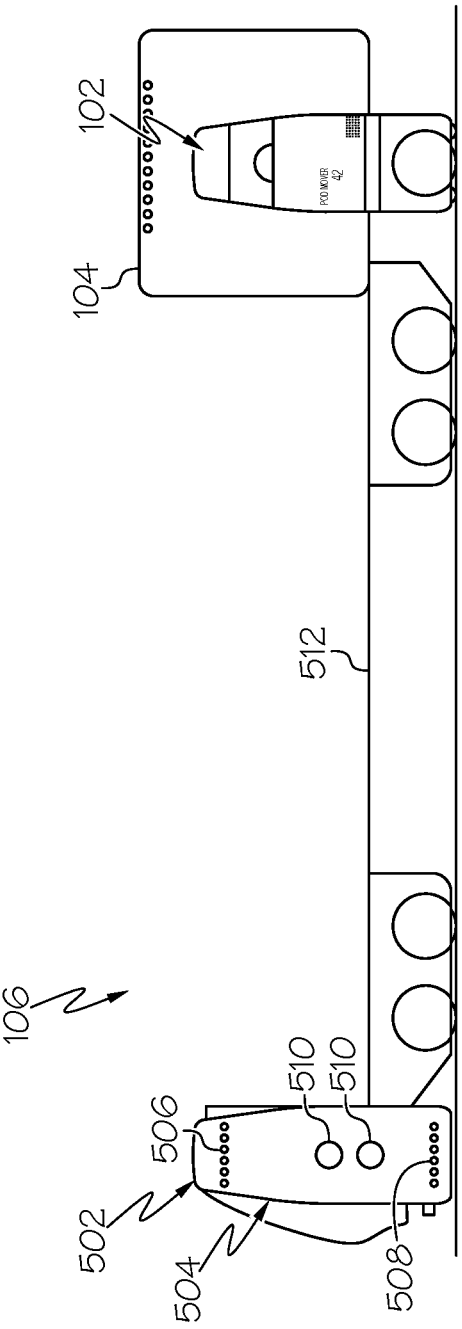
FIG. 5B schematically depicts the system of FIG. 5A at a different state of the system.

Referring now to FIGS. 5A-5D, the pair of secondary vehicles 102 are shown loading a modular pod 104 onto the primary vehicle 106, according to some embodiments. As depicted in FIG. 5A, the pair of secondary vehicle 102 are carrying a modular pod 104 towards the primary vehicle 106. As the pair of secondary vehicles 102 approach a bed 512 of the primary vehicle 106, the pair of secondary vehicles 102 may further lift (e.g., translate vertically) the modular pod 104. As depicted in FIG. 5B, after further lifting the modular pod 104, the pair of secondary vehicles 102 may place the modular pod 104 onto the bed 512. In these embodiments, the bed 512 may include powered rollers or a conveyor belt to translate the position of the modular pod 104 along the bed 512. In embodiments, the pair of secondary vehicles 102 place the modular pod 104 at a desired positioned on the bed 512.

As illustrated in FIG. 5C, the primary vehicle 106 may further include a cabin 502 and a pair of docking stations 504. The cabin 502 may be used for controlling the primary vehicle 106 when the primary vehicle 106 requires a user to operate the primary vehicle 106. The docking stations 504 are positioned on opposing sides of the cabin 502. The docking stations 504 are utilized to physically couple and electrically couple the pair of secondary vehicles 102 to the cabin 502. The pair of docking stations 504 may each include a first set of vehicle receiving apertures 506, a second set of vehicle receiving apertures 508, and one or more power outlets 510.

As depicted in FIG. 5D, each of the pair of secondary vehicles 102 move to be in alignment with each of the pair of docking stations 504. Once each pair of secondary vehicles 102 is aligned to a respective docking station 504, each pair of secondary vehicles 102 may extend a first set of retractable bars and a second set of retractable bars to the first set of vehicle receiving apertures 506 and the second set of vehicle receiving apertures 508, respectively. The pair of secondary vehicles 102 may include locking mechanisms to secure the first set of retractable bars and the second set of retractable bars onto the primary vehicle 106. In embodiments, the primary vehicle 106 includes a locking mechanism to secure the first set of retractable bars and the second set of retractable bars, thereby coupling the pair of secondary vehicles 102 to the primary vehicle. In embodiments, the set of wheels of the secondary vehicle 102 may retract into each of the pair of secondary vehicles 102. In other embodiments, the primary vehicle 106 is configured to lift each of the pair of secondary vehicles 102 after coupling to each of the pair of docking stations 504. In this way, the wheels are not damaged or prematurely worn in response to the primary vehicle 106 traveling.

From the above, it is to be appreciated that defined herein is a system that includes a primary vehicle and a pair of secondary vehicles which co-operatively facilitate for efficient use of modular pod space. The pair of secondary vehicles may co-operatively move (e.g., translate) modular pods within the modular pod space. The pair of secondary vehicles may then place (e.g., load) the modular pods on to the primary vehicle. In embodiments, the pair of secondary vehicles may be coupled to and translate with the primary vehicle. Further, the pair of secondary vehicles may be configured to have improved maneuverability using spherical wheels within the modular pod space. The pair of secondary vehicles may also include sets of retractable bars in order to translate the modular pods as well as to couple to the primary vehicle. Various embodiments of the apparatus and the operation of the apparatus are described in more detail herein. Whenever possible, the same reference numerals will be used throughout the drawings to refer to the same or like parts.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A system comprising:
   a main vehicle;
   a secondary vehicle configured to couple to the main vehicle, the secondary vehicle comprising:
   a wheel configured to move the secondary vehicle; and
   a body coupled to the wheel, the body comprising:
   a set of apertures, each of the apertures defining a vertically elongated oval shape; and
   a first set of retractable bars, configured to:
   extend into receivers of the main vehicle in a deactivated state;
   translate vertically within the apertures;
   be disposed in the body in a retracted state; and
   extend into a pod and lift the pod in an attached state.

2. The system of claim 1, wherein the secondary vehicle further comprises a second set of retractable bars configured to:
- extend into receivers of the main vehicle in the deactivated state;
- be disposed in the body in the retracted state, and
- extend into the pod and lift the pod in the attached state.

3. The system of claim 1, wherein the secondary vehicle further comprises a gyroscope to maintain an orientation of the secondary vehicle during movement of the secondary vehicle.

4. The system of claim 1, wherein the secondary vehicle further comprises a controller programmed to:
- obtain a first position of the pod while the first set of retractable bars are in the retracted state;
- based on the first position, instruct the secondary vehicle to move to a predetermined distance away from the pod; and
- instruct the first set of retractable bars to extend into the pod and to lift the pod.

5. The system of claim 4, wherein the controller is further programmed to:
- receive signals from a plurality of presence sensors.

6. The system of claim 5, wherein the controller is further programmed to generate a three-dimensional environment surrounding the secondary vehicle, based on the signals.

7. The system of claim 5, wherein the plurality of presence sensors are at least one of visual sensors and proximity sensors.

8. The system claim 1, wherein the wheel is a spherical wheel.

9. The system of claim 1, further comprising a tertiary vehicle, wherein:
- the secondary vehicle is configured to be coupled to a first side of the main vehicle; and
- the tertiary vehicle is configured to be coupled to a second side of the main vehicle.

10. The system of claim 1, wherein the secondary vehicle is electrically coupled to the main vehicle.

11. The system of claim 1, wherein the secondary vehicle further comprises a controller programmed to:
- detect a distance of the pod away from the secondary vehicle via a plurality of presence sensors;
- based on the distance, translate the secondary vehicle to the pod;
- extend the first set of retractable bars into the pod; and
- translate the pod to a predetermined location via the secondary vehicle.

12. The system of claim 1, further comprising a docking station, wherein the docking station is disposed on an external surface of a cabin of the main vehicle.

13. The system of claim 1, wherein the main vehicle includes a bed; and
the main vehicle comprises a controller programmed to:
- in response to placing the pod onto the bed of the main vehicle, translate a position of the pod on the bed via a conveyor belt for the bed of the main vehicle.

14. The system of claim 1, wherein the main vehicle comprises a controller programmed to:
- in response to coupling the secondary vehicle to the main vehicle, lift the secondary vehicle relative to the main vehicle via the main vehicle.

15. A pod mover comprising:
- a body having a set of apertures, each of the apertures defining a vertically elongated oval shape;
- a set of retractable bars, the set of retractable bars vertically translatable within the apertures; and
- a controller programmed to:
- detect a coupling between the set of retractable bars and a pod;
- instruct the pod mover to place the pod onto a bed of a truck in response to detecting the coupling;
- detect a decoupling between the set of retractable bars and the pod; and
- instruct the pod mover to couple to a docking station disposed on the truck in response to detecting the decoupling.

16. The pod mover of claim 15, wherein the controller is further programmed to:
- in response to coupling the pod mover to the docking station, retract a wheel of the pod mover into a base of the pod mover.

17. The pod mover of claim 15, wherein the controller is further programmed to:
- in response to coupling the pod mover to the docking station, electrically couple a battery of the pod mover to the truck.

18. The pod mover of claim 15, further comprising a gyroscope to maintain an orientation of the pod mover during movement.

* * * * *